United States Patent [19]
Fisher et al.

[11] 3,863,516
[45] Feb. 4, 1975

[54] ENDLESS POWER TRANSMISSION BELT

[75] Inventors: David G. Fisher; Mark W. Krueger; Clinton L. Bishop, all of Springfield, Mo.

[73] Assignee: Dayco Corporation, Dayton, Ohio

[22] Filed: Oct. 11, 1973

[21] Appl. No.: 405,380

[52] U.S. Cl. .................................... 74/233, 74/234
[51] Int. Cl. ........................... F16g 5/16, F16g 5/00
[58] Field of Search ............................. 74/233, 234

[56] References Cited
UNITED STATES PATENTS

| | | | |
|---|---|---|---|
| 3,164,026 | 1/1956 | Terhune | 74/233 |
| 3,566,706 | 3/1971 | Fix | 74/233 |
| 3,657,938 | 4/1972 | Fisher | 74/233 |

*Primary Examiner*—Leonard H. Gerin

[57] ABSTRACT

An endless power transmission belt having a tension section, compression section, and a load-carrying section wherein at least one of the sections is comprised of a poly (propylene oxide) rubber and a textile material with the poly (propylene oxide) rubber being blended with neoprene rubber to provide a rubber blend which adheres to the textile material.

11 Claims, 4 Drawing Figures

3,863,516

ENDLESS POWER TRANSMISSION BELT

BACKGROUND OF THE INVENTION

It has been found that poly (propylene oxide) rubber has properties including improved tensile and tear strength over a wide temperature range, flex life and crack growth resistance, weather resistance, low temperature flexibility, dynamic properties such as low heat build up, heat resistance to at least 300°F, and oil resistance which make this rubber highly desirable for use in an endless power transmission belt of the type made primarily of elastomeric materials. However, it has been found that poly (propylene oxide) rubber will not adhere to textile materials of the types commonly used in endless power transmission belts.

SUMMARY

This invention provides an endless power transmission belt made primarily of elastomeric materials and comprised of a tension section, a compression section, and load-carry section; and, in order to take advantage of the properties of poly (propylene oxide) rubber at least one of the sections is comprised of poly (propylene oxide) rubber and a textile material. The poly (propylene oxide) rubber is blended with a neoprene rubber to provide a rubber blend which adheres to the textile material to thereby assure the belt has optimum structural integrity.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
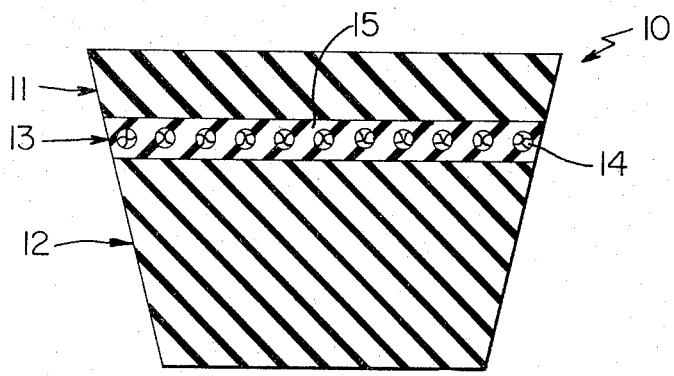
FIG. 1 is a cross-sectional view illustrating one exemplary embodiment of the endless power transmission belt of this invention.

Reference is now made to FIG. 1 on the drawing which illustrates one exemplary embodiment of the endless power transmission belt of this invention which is designated generally by the reference numeral 10. The belt 10 is often referred to as a V-belt and in this example is shown as having a substantially trapezoidal cross-sectional configuration; and, the belt 10 has a tension section 11, a compression section 12, and a load-carrying section 13 which includes a spirally wound load-carrying cord 14.

The cord 14 is made of a suitable textile material and to assure that cord 14 is bonded in the belt 10 with optimum adhesion and in particular is bonded with optimum adhesion in the load-carrying section 13 which is comprised of poly (propylene oxide) rubber, the cord is embedded in a rubber compound or rubber blend 15 which will also be referred to as matrix 15. The matrix or rubber blend 15 is comprised of the poly (propylene oxide) rubber and neoprene rubber and the amount of each of these two rubbers which is used may vary and as will be described in more detail subsequently.

The tension section 11 and the compression section 12 of belt 10 may each be made of any suitable elastomeric material. Further, each of these sections 11 and 12 may be made of a blend of poly (propylene oxide) rubber and neoprene rubber which may be the same as the matrix 15, i.e., has the same weight ratio of each of these two rubbers therein as in the matrix 15, or the amount of poly (propylene oxide) and neoprene rubber in each of the tension section 11 and the compression section 12 may be varied, as desired, depending on the performance expected of the belt 10.

Figure 2:
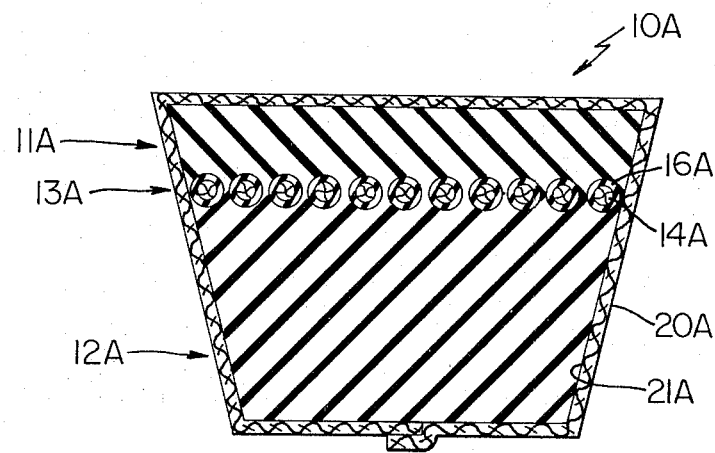
FIG. 2 is a cross-sectional view illustrating another exemplary embodiment of the endless power transmission belt of this invention which has a fabric cover provided therearound.
Figure 3:
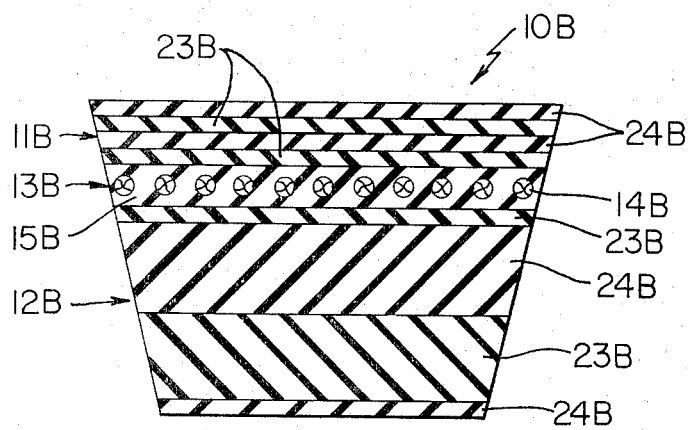
FIG. 3 is a cross-sectional view illustrating another exemplary embodiment of the endless power transmission belt of this invention which has a load-carrying section similar to the belt of FIG. 1.
Figure 4:
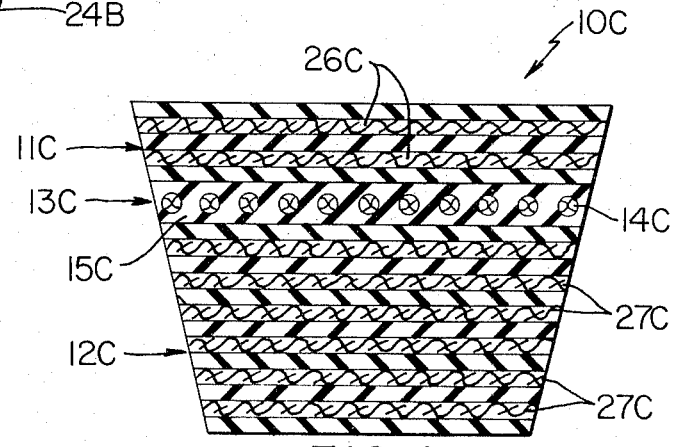
FIG. 4 is a cross-sectional view illustrating another exemplary embodiment of the endless power transmission belt of this invention which has spaced apart woven fabric layers in each of its tension and compression sections.

Other exemplary embodiments of belts of this invention are illustrated in FIGS. 2, 3, and 4. The belts illustrated in FIGS. 2, 3, and 4 are similar to the belt 10; therefore, such belts would be designated by the reference numerals 10A, 10B, and 10C respectively and portions of each belt which are similar to corresponding portions of the belt 10 will be designated in the drawing by the same reference numerals as in the belt 10 followed by an associated letter designation; either A, B, or C and not described again in detail. Only those component portions of each belt 10A, 10B, or 10C which are different from or in addition to corresponding portions of the belt 10 will be designated by a new reference numeral also followed by the associated letter designation and described in detail.

The belt 10A illustrated in FIG. 2 has a spirally wound load-carrying cord 14A provided as a portion of its load-carrying section 13A and the load-carrying cord 14A is made of a suitable textile material and has an annular coating 16A, when viewed in cross section, of a blend of poly (propylene oxide) rubber and neoprene rubber around the cord 14A which assures optimum adhesion of such cord in the belt 10A. The entire tension section 11A and the entire compression section 12A in each instance is made of poly (propylene oxide) rubber.

The belt 10A also has a cover 20A made of a suitable textile material and such cover may be in the form of a woven textile fabric having the usual warps and wefts therein. In addition, the cover 20A has a layer 21A of a suitable rubber blend of poly (propylene oxide) and neoprene rubber on its inside surface which assures adhesion of the layer 21A to the textile material comprising the woven cover 20A and the layer 21A is bonded about the entire periphery of the belt 10A.

The belt 10B, illustrated in FIG. 3, is comprised of a load-carrying section 13B which includes a spirally wound load-carrying cord 14B embedded in a matrix or rubber blend 15B in a similar manner as the cord 14 in the matrix 15 of the belt 10; however, the tension and compression sections 11B and 12B respectively are each comprised of alternating layers 23B of neoprene rubber and layers 24B of a blend of poly (propylene oxide) rubber and neoprene rubber. In this example, a neoprene rubber layer 23B is provided in each of the tension and compression sections immediately adjoining the load-carrying section 13B. In addition, it will be seen that two layers 23B having different thicknesses are provided in the compression section 12B together with two layers 24B also of different thicknesses.

The belt 10C, illustrated in FIG. 4, is comprised of a load-carrying section 13C having a spirally wound loadcarrying cord 14C made of a suitable textile material and the cord 14C is embedded in a suitable matrix or rubber blend 15C of poly (propylene oxide) rubber and neoprene rubber. The tension section 11C of the belt 10C is comprised of a plurality of vertically spaced parallel layers 26C of textile fabric preferably in a form of a woven fabric. The layers 26C are embedded in a matrix or blend of poly (propylene oxide) rubber and neoprene rubber to assure they are bonded in position in a high strength manner.

The compression section 12C also has a plurality of vertically spaced parallel layers 27C of woven textile material; and, the layers 27C are embedded in a matrix or rubber blend of poly (propylene oxide) rubber and neoprene rubber.

It will also be appreciated that to provide even better adhesion between each fabric layer 26C and 27C and the rubber blend of its associated section either 11C or 12C, each fabric layer may have its opposed surfaces treated with suitable materials such as suspensions of poly (propylene oxide) rubber and neoprene rubber, for example.

Although the amount by weight of poly (propylene oxide) rubber and neoprene rubber in each section of each belt may vary depending upon the desired physical properties of each of the endless power transmission belts of this invention the amount of poly (propylene oxide) rubber therein may constitute between 25 percent and 75 percent of the total rubber by weight with the remainder of the blend being neoprene rubber. However, it has been found that a rubber blend constituting approximately 50 percent poly (propylene oxide) rubber and 50 percent neoprene rubber by weight provides a ratio which utilizes the best properties of each of these rubbers to a maximum.

In this disclosure of the invention, the belts 10, 10B, and 10C are shown as raw-edged belts with the belt 10A being a covered belt; however, it will be appreciated that each of the illustrated belts may be covered with a suitable cover and that the belt 10A may also be in the form of a raw-edged belt.

Each of the belts disclosed herein is shown as having a spirally wound load-carrying cord as the strength member of its load-carrying section; however, it is to be understood that the strength member in each instance may be defined in any suitable manner known in the art.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising, a tension section, a compression section, and a load-carrying section, at least one of said sections being comprised of a poly (propylene oxide) rubber and a textile material, said poly (propylene oxide) rubber being blended with neoprene rubber to provide a rubber blend which adheres to said textile material with optimum adhesion, said rubber blend consisting of a blend having poly (propylene oxide) rubeer therein which constitutes between 25 percent and 75 percent by weight of the total weight of the rubber blend, with the remainder of the blend being said neoprene rubber.

2. A belt as set forth in claim 1 in which said one section is said load-carrying section and said textile material is in the form of a spirally wound load-carrying cord having said blend adhered thereto.

3. A belt as set forth in claim 2 in which said tension and compression sections are also made of said blend.

4. A belt as set forth in claim 1 in which said one section is said load-carrying section and said textile material is in the form of a spirally wound load-carrying cord having a coating of said blend therearound.

5. A belt as set forth in claim 4 in which said tension and compression sections are made of said poly (propylene oxide) rubber.

6. A belt as set forth in claim 1 in which said one section is said tension section and said textile material comprises at least one layer of a textile fabric having opposed surfaces bonded to said blend.

7. A belt as set forth in claim 1 in which said one section is said compression section and said textile material comprises at least one layer of a textile fabric having opposed surfaces bonded to said blend.

8. A belt as set forth in claim 1 in which said textile material is in the form of a woven textile fabric.

9. A belt as set forth in claim 1 in which said rubber blend constitutes 50 percent poly (propylene oxide) rubber and 50% neoprene rubber by weight.

10. A belt as set forth in claim 1 having a cover made of a textile material, said cover having a layer of said rubber blend on its inside surface to assure said cover adheres around said belt in a high-strength manner.

11. A belt as set forth in claim 10 in which said cover is made of a woven textile material and said rubber blend also extends between the warps and wefts of said woven fabric.

* * * * *